United States Patent [19]

Piacenti et al.

[11] Patent Number: 4,745,009

[45] Date of Patent: May 17, 1988

[54] METHOD FOR PROTECTING STONE MATERIALS FROM ATMOSPHERIC AGENTS BY MEANS OF PERFLUOROPOLYETHER DERIVATIVES

[75] Inventors: Franco Piacenti, Firenze; Adolfo Pasetti, Milan; Ugo Matteoli, Firenze; Ezio Strepparola, Bergamo, all of Italy

[73] Assignee: Ausimont S.p.A., Milan, Italy

[21] Appl. No.: 831,615

[22] Filed: Feb. 21, 1986

[30] Foreign Application Priority Data

Feb. 22, 1985 [IT] Italy .................. 19628 A/85

[51] Int. Cl.$^4$ .................................. B05D 3/02
[52] U.S. Cl. ..................... 427/393.5; 427/385.5; 428/540
[58] Field of Search ............. 427/393.6, 385.5

[56] References Cited

U.S. PATENT DOCUMENTS

| | | | |
|---|---|---|---|
| 3,795,533 | 3/1974 | Gauri | 428/540 X |
| 4,085,137 | 4/1978 | Mitsch et al. | 260/561 HL |
| 4,321,177 | 3/1982 | Wilkinson | 427/421 X |
| 4,327,139 | 4/1982 | Schaefer et al. | 428/422 X |

FOREIGN PATENT DOCUMENTS 0059100 9/1982 European Pat. Off. .

*Primary Examiner*—Thurman K. Page
*Attorney, Agent, or Firm*—Stevens, Davis, Miller & Mosher

[57] ABSTRACT

A process for protecting manufactured structures or articles of marble, stones, tiles, cement and the like from the action of polluting and atmospheric agents, by applying a perfluoropolyether onto the surface of the manufactured structure or article, characterized in that there is utilized a perfluoropolyether having at one or both its ends functional groups selected from carboxylic, ester or amidic groups.

8 Claims, 1 Drawing Sheet

METHOD FOR PROTECTING STONE MATERIALS FROM ATMOSPHERIC AGENTS BY MEANS OF PERFLUOROPOLYETHER DERIVATIVES

BACKGROUND OF THE INVENTION

It is known that the perfluoropolyethers impart a marked hydrophobic property to the surface of materials to which they are applied.

Furthermore, the perfluoropolyethers have a high Bunsen coefficient for the air gas components, wherefore they permit a good penetration of the air through the surface of the treated materials.

These properties render the perfluoropolyethers interesting as liquids suitable for protecting building works and, in general, structures and articles manufactured from stones, marble, cement, tiles or wood from atmospheric agents. Such action is the more appreciated as the protection is reversible, being based on the deposition of a thin liquid layer onto the article surface, such layer being also removable, if necessary.

Furthermore, the low refraction index of the perfluoropolyethers, which corresponds to a value of about 1.3, measured at 20° C. by the light of a sodium lamp, enables the treated article to retain its original appearance, avoiding optical interference phenomena which lead to an alteration of the colors.

The use of the aforesaid perfluoropolyethers has been described in European Pat. No. 59,100.

The perfluoropolyethers indicated by the above-cited prior art were of the type with "neutral" end groups, i.e., consisting of perfluoroalkyl groups which are chemically highly inert.

It was observed that the presence of porosity in the material to be protected leads to the phenomenon of a slow absorption of the perfluoropolyether of the type used so far, such phenomenon causing a more or less slow migration, depending on the type of porosity of the material of the protective liquid towards the innermost layers of the manufactured structures. That results in a lower effectiveness, in the long run, of the protection of the outermost areas of the treated structure. While on particular materials, such as, e.g., sandstones, such diffusion effect towards the inside is sufficiently slow as to provide protection stability for a long time, in other cases, for example in tiles, such phenomenon causes a decrease in the protective action at the surface as to require, after certain periods of time, further surface treatments, being, however, understood that the protection of the underlying layers remains sufficient to considerably slacken the alteration phenomena.

BRIEF DESCRIPTION OF THE DRAWING

The sole FIGURE deplict an apparatus used to conduct a water vapor permeability test.

THE PRESENT INVENTION

Figure 1:
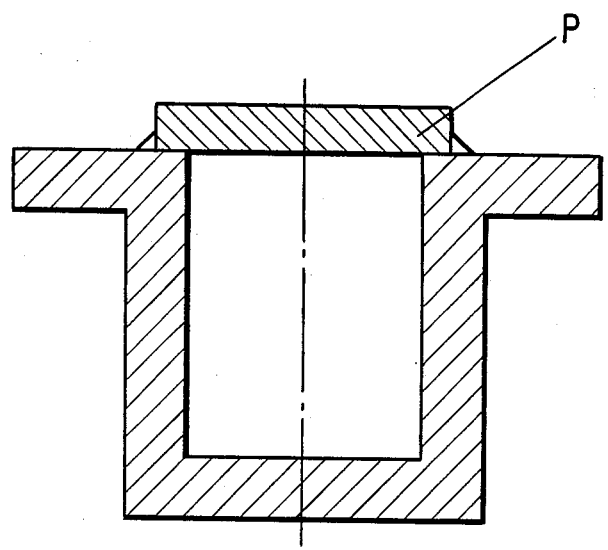

We have now found that it is possible to obtain a permanent protective action for the surface area of the materials mentioned hereinbefore when perfluoropolyethereal derivatives with functional end groups consisting of the free carboxylic acid group or the carboxylic acid group chemically bound as an ester or amide group, are utilized as protective agents or as coadjuvants for the protection.

Such functionalized end groups fix to the substrate to be protected through the formation of chemical bonds or of hydrogen bonds having a sufficient stability, thereby reducing the mobility of the perfluoropolyether and increasing the duration of the protective action on the treated surface.

The other characteristics of use of these perfluoropolyethereal functionalized fluids remain analogous with those of the perfluoropolyethers indicated in European Pat. No. 59,100. In particular, such fluids exhibit:

(1) capability of giving rise to a thin, low-volatile protective layer which is resistant to the most aggressive chemical agents, such as, e.g., acids and alkali, which results in a high stability to the atmosphere and to the pollutants thereof;

(2) a high thermal stability and retention of the fluid state also at low ambient temperature;

(3) a low surface tension;

(4) a high water-repellency;

(5) a high oil-repellency;

(6) permeability to air and to water vapor;

(7) stability to light radiations and, in particular, to ultraviolet radiations;

(8) reversibility, which remains constant over time.

In particular, the perfluoropolyethers which we have found to be utilizable for a permanent protective action belong to one of the following groups:

$$Rf-O(C_3F_6O)_m(CFXO)_n-A \qquad I$$

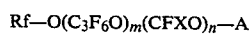

wherein Rf is a perfluoroalkyl group with 1 to 3 carbon atoms; $(C_3F_6O)$ and $(CFXO)$ are oxyperfluoroalkylene units statistically distributed along the chain, and X is F or $CF_3$;

m and n are integers or n is zero (m is always different from 0) and m/n varies from 5 to 40 if n is other than 0;

A is a group $-CFX-COY$ where X is F or $CF_3$ and Y is OH, OR', NR", R'" wherein R' may be an alkyl group with 1 to 8 carbon atoms, an aromatic or alkylaromatic group such as, for example, difluoro-benzyl $-CF_2-C_6H_5$; the aromatic groups may be substituted by alkyl or polyethoxy groups;

R" may be H or an alkyl group with 1 to 8 carbon atoms or a substituted phenyl group;

R'" may be H or an alkyl group with 1 to 8 carbon atoms or a substituted phenyl group.

The average molecular weight ranges from 500 to 10,000, and in a presently preferred embodiment, is from 900 to 6,000.

$$A'-(C_2F_4O)_p(CF_2O)_q-A' \qquad II$$

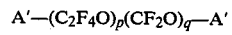

wherein the units $(C_2F_4O)$ and $(CF_2O)$ are statistically distributed along the chain;

p and q are such integers that p/q may vary from 2 to 0.5, preferably from 1 to 0.6;

A' is $-CF_2-COY$;

Y is the same as defined hereinabove;

the average molecular weight varies from 1,000 to 20,000 from 1,800 to 12,000 in the presently preferred embodiment.

The compounds of classes I and II can be used as such or dissolved in fluorocarbides of fluorochlorocarbides, with a boiling point preferably not higher than 80° C. Furthermore, they can be used in admixture with perfluoropolyethers with neutral end groups, having one of the following structures III or IV:

$$Rf\text{—}O\text{—}(C_3F_6O)_m(CFXO)_nRf' \quad \text{III}$$

in which $(C_3F_6O)$ and $(CFXO)$ are units statistically distributed along the chain;

Rf' may be like or unlike Rf and both consist of groups $CF_3$, $C_2F_5$, $C_3F_7$;

X is F or $CF_3$;

m is an integer; n is an integer or 0;

if n is 0, Rf and Rf' are $C_2F_5$ or $C_3F_7$; if n is different from 0, the m/n ratio varies from 5 to 40;

the average molecular weight varies from 4,000 to 10,000.

$$CF_3\text{—}(C_2F_4O)_p(CF_2O)_qCF_3 \quad \text{IV}$$

wherein the units $(C_2F_4O)$ and $(CF_2O)$ are statistically distributed along the chain and p and q are the same as defined hereinabove;

the molecular weight ranges from 4,000 to 16,000.

The weight ratio between the compounds having functionalized end groups of type I or II, and the compounds having neutral end groups of type III or IV expressed as I+II/III+IV is equal to or higher than 0.01.

The application of products I, II either in the presence or in the absence of products III, IV is preferably carried out in a 1,1,2-trifluorotrichloroethane solution containing 50 to 80% by weight of perfluoropolyethereal products and it can be accomplished by spraying an atomized liquid jet (spout) with or without compressed air, or by any other suitable method.

By the process according to the present invention it is possible to obtain a better protection of constructions and articles manufactured from stone, marble, cement and wood as compared with the use of the perfluoropolyethers described in European Pat. No. 59,100. Such higher protection is achieved through the use of products having a telomer structure containing a chain of the perfluoropolyethereal type similar to the one claimed in the European patent but having functional end groups capable of exerting an anchoring action on the article surface, thus, in the long run, rendering the surface protective action more stable.

The amount of perfluoropolyethereal protective agent to be used in accordance with this invention is highly dependent on the nature of the material to be protected, in particular on its porosity. Such amount may range from amounts even lower than 10 $g/m^2$ for very compact materials (Carrara marble) up to 300 $g/m^2$ and over for very porous materials.

The following examples are given for illustrative purposes and are not intended to limit the embodiment possibilities when mixtures with neutral-end-group-perfluoropolyethers are utilized.

EXAMPLE 1

Two Carrara marble samples having the same composition, a porosity lower than 1% and a cubic form of 50 mm side were taken.

One of the samples was surface-treated with a derivative of a perfluoropolyether of type I endowed with an acid end group converted into isobutylamide having an average molecular weight of 5,000, while the other sample was left untreated as a check.

The perfluoropolyether isobutylamide derivative was applied using a compressed air sprayer in such a manner as to cause an amount of protective fluid equal to 30 $g/m^2$ to deposit onto the sample furnace. After seven days, the amount of water absorbed in the time was measured on the two samples. Such measurement was effected by applying to a face of each sample a device consisting of a glass cylinder full of water and connected with a graduated micropipette which permits to measure the water amount absorbed by the surface in contact with said sample. This device is described with further details in the document published by the group Unesco-Rilem PEM, No. 78/182. The absorbed water amount is read at pre-established intervals of time and the read value is expressed in microliters/$cm^2$ of surface.

In the treated sample, the water absorbed per $cm^2$ was practically equal to zero up to a time of 30 minutes; in the untreated sample the absorbed amounts were conversely of 1.5 after 10 minutes, 4.6 after 20 minutes and 7.6 after 30 minutes (expressed in microliters per $cm^2$).

From a comparison between the two samples it is apparent that the surface treatment with the protective agent strongly reduces the speed at which the water penetrates into the interior of the stone.

EXAMPLE 2

From an organogen limestone block (Vicenza stone) there were cut two cubic samples of 2.5 cm side. After determination of the porosity, which, on the average, was 30%, one of the samples was treated on its entire surface with an amount equal to 300 $g/m^2$ of the isobutylester derivative of a perfluoropolyether of type I, having a molecular weight equal to 5,000.

The other sample was left as such as a check. Subsequently, both samples were thoroughly immersed in deionized water and then drawn out, weighed and immersed again, at preestablished intervals of time (10, 40, 80, 160, 320, 1440 minutes, and so on to saturation).

The results of the tests are summarized in the following table, which shows the imbibition coefficients on the basis of the prefixed times.

| Times | 10" | 40' | 80' | 160' | 5 h | 24 h | 170 h | 1700 h |
|---|---|---|---|---|---|---|---|---|
| treated | 0.30 | 0.62 | 1.24 | 2.27 | 3.93 | 4.57 | 6.26 | 9.65 |
| untreated | 9.25 | 9.54 | 9.63 | 9.67 | 10.14 | 10.31 | 11.41 | 12.79 |

The imbibition coefficient is expressed by the grams of water absorbed for 100 grams of dry sample.

From the comparison of the two samples there are apparent both the high effectiveness of the present protective agent, even with a highly porous lithoid material, and the considerable kinetic effect of hindering the inlet of water even for stretches of time of the order of 24 hours.

EXAMPLE 3

There were prepared 4 disc-shaped samples of Carrara marble having a porosity lower than 1%, a thickness of 4 mm and a diameter of 2.5 cm. One of the two flat surfaces of 3 samples (leaving the fourth as a check) was treated with amounts of protective agent corresponding to 30 $g/m^2$, i.e., equal to the amount which has provided satisfactory results for the protection.

The protective agents employed on the various samples were:

sample 1—isobutylamide derivative of a perfluoropolyether of type II and having an average molecular weight of 1,090;

sample 2—terbutylamide derivative of a perfluoropolyether of type I and having an average molecular weight of 600;

sample 3—isobutylester derivative of a perfluoropolyether of type I and having a molecular weight below 5,000;

sample 4—untreated (check).

The individual samples were subjected to a water vapor permeability test, which was carried out as follows: each sample was fixed by means of a sealing agent to a Plexiglas container as shown in FIG. 1 of the accompanying drawing, wherein P indicates the sample.

Into the container there were previously introduced 2.5 cm$^3$ of water; the whole was weighed and then introduced into a calcium chloride-drier.

At prefixed intervals of time the sample-container group was weighed. The tests were conducted at a constant temperature of 20° C. The test was interrupted after 144 hours and the final weight losses were respectively as follows:

sample 1—0.103 g equal to 92% of the check sample;
sample 2—0.097 g equal to 87% of the check sample;
sample 3—0.093 g equal to 83 % of the check sample;
sample 4—0.112 g (check sample).

The results of this example prove, for all the products tested, that the permeability to water vapor remains, after the treatment, considerably high with respect to the untreated stone material.

EXAMPLE 4

Three samples of "Serena" stone and three samples of Carrara marble for statues were respectively treated with the same three perfluoropolyethereal derivatives used in preceding Example 3.

The application was carried out by means of a brush till reaching an amount of the protective agent deposited on the sample surface equal to 30 g/m$^2$ in the case of the marble for statues and to 60 g/m$^2$ in the case of the "Serena" stone. The samples were then subjected to U.V. radiation by means of a low pressure mercury vapor lamp of "Duro-Test International", type TL 20/80 (F20T12BLB), 20 watts. The samples were placed at a distance of 20 cm from the lamp and irradiation was carried on during 72 hours at a temperature of 40° C. After such test, no variations in the natural color of the treated surfaces were observed, there were no traces of stone alteration products (for example, fluorite), nor of protective agents alterations as determined by difractometric X-ray analyses and IR spectroscopy.

EXAMPLE 5

On the same samples utilized in preceding Example 4 and after the ultraviolet light treatment, the following test was conducted: from the individual samples, according to a "compress" method and using trichlorotrifluoroethane as a solvent, there were extracted the protective agents employed; analyses carried out by infrared spectroscopy on portions of sample surface, before and after the extraction of the protective agent, revealed the complete removal of the protective agent in, in consequence, the complete reversibility even after exposure to ultraviolet light.

EXAMPLE 6

Two Carrara marble samples of cubic shape with a 5 cm side were respectively treated, on one face, with:

sample 1—perfluoropolyether "Fomblin Met" produced by Montefluos S.p.A., Milan, in amounts equal to 30 g/m$^2$. "Fomblin Met" is a mixture consisting of 30 parts by weight of $CF_2Cl\text{-}CFCl_2$ and of 70 parts by weight of Fomblin YR, perfluoropolyether of type III, which is a perfluoropolyether having an average molecular weight of about 6,000, a kinematic viscosity of about 1,000 cSt and neutral end groups;

sample 2—isobutylamide derivative of a perfluoropolyether of type I, and having a molecular weight of 600, in amounts equal to 30 g/m$^2$.

The two samples were allowed to stand, taking care to maintain the treated surfaces in an upright position: after respectively 15, 30 and 60 days from the treatment, from each of the two samples a 3 mm thick slice was separated by sawing, the cutting being done according to a plane perpendicular to the face treated with the protective agent, i.e., in the direction of diffusion of said agent. Onto the slices so obtained, a very thin layer of metallic gold was deposited, using a common high-vacuum metalizer, type "Galileo" V 201r/00440. As metalization occurred only on the areas on which the protective agent was not present, such method evidenced the rate at which the protective agent advanced into the samples. The advancement depths (expressed in mm) of the two protective agents in the samples were as follows:

| days | 15 | 30 | 60 |
|---|---|---|---|
| sample 1 | 3.0 | 5.1 | 6.5 |
| sample 2 | 1.1 | 1.2 | 1.2 |

The results of this example show the higher permanence (lower mobility), in the surface area of the stone material, of a protective agent functionalized according to the present invention with respect to a non-functionalized perfluoropolyether.

What is claimed is:

1. A process for protecting marble, stones, tiles, cement, and other similar materials utilized in particular in building works, from the degradation caused by atmospheric agents and pollutants, which process comprises applying to the surfaces of said materials a protective agent selected from perfluoropolyethers having functionalized end groups and belonging to one of the following two groups:

(a) products of general formula:

$$Rf\text{—}O\text{—}(C_3F_6O)_m(CFXO)_n\text{—}A \qquad (I)$$

wherein

Rf is a perfluoroalkyl group having 1 to 3 carbon atoms; $(C_3F_6O)$ and $(CFXO)$ are oxyperfluoroalkylene units statistically distributed along the chain, and X is F or $CF_3$;

m and n are integers or n is 0, m being always different from 0, and m/n varies from 5 to 40 when n is different from 0;

A is group —CFX—COY wherein X is F or $CF_3$ and Y is OH, OR', NR"R'", wherein R' may be an alkyl group with 1 to 8 carbon atoms, an aromatic or alkylaromatic group, or an aromatic group substituted by polyethoxy groups;

R" may be H or an alkyl group containing from 1 to 8 carbon atoms, or a substituted phenyl group;

R'" may be H or an alkyl group with 1 to 8 carbon atoms or a substituted phenyl group;

the average molecular weight of said product of formula I being from 500 to 10,000;

(b) products of general formula:

$$A'\text{---}(C_2F_4O)_p(CF_2O)_q\text{---}A'$$

wherein
- units $(C_2F_4O)$ and $(CF_2O)$ are statistically distributed along the chain;
- p and q are such integers that p/q varies from 2 to 0.5;
- A' is $-CF_2-COY$;
- Y is as defined hereinabove;
- the average molecular weight of the product of formula II being from 1,000 to 20,000.

2. The process according to claim 1, characterized in that the perfluoropolyether of general formula I or II is used in admixture with a perfluoropolyether having neutral end groups and belonging to one of the following classes:

$$Rf\text{---}O\text{---}(C_3F_6O)_m(CFXO)_n\text{---}Rf' \qquad (III)$$

wherein
- $(C_3F_6O)$ and $(CFXO)$ are units statistically distributed along the chain;
- Rf' may be like or unlike Rf and both consists of groups $CF_3$, $C_2F_5$, $C_3F_7$ and X is F or $CF_3$;
- m and n are integers;
- when n is 0, Rf and Rf' are $C_2F_5$ or $C_3F_7$;
- when n is different from 0, the m/n ratio varies from 5 to 40;
- the average molecular weight of the product having end groups of formula III being from about 4,000 to about 10,000;

$$CF_3\text{---}(C_2F_4O)_p(CF_2O)_qCF_3 \qquad (IV)$$

wherein units $(C_2F_4O)$ and $(CF_2O)$ are statistically distributed along the chain and p and q are the same as in formula II; the molecular weight of the products having end groups of formula IV being from 4,000 to 16,000.

3. The process according to claim 2, in which the weight ratio between the perfluoropolyethers having functionalized end groups and the perfluoropolyethers having neutral end groups is equal to or higher than 0.01.

4. The process according to claim 1, in which the product of formula I has a molecular weight of about 900 to about 6,000.

5. The process according to claim 1, in which p/q varies from 1 to 0.6.

6. The process according to claim 1, in which the product of formula II has a molecular weight of from about 1,800 to about 12,000.

7. The process according to claim 1, in which R' in the group OR' is difluorobenzyl.

8. The process according to claim 1 wherein the perfluoropolyether is applied with a fluorocarbide solvent, a fluorochlorocarbide solvent, or a solvent mixture thereof.

* * * * *